United States Patent
Buekers et al.

(10) Patent No.: US 7,393,425 B2
(45) Date of Patent: Jul. 1, 2008

(54) METHODS FOR CABLE SEALING

(75) Inventors: Valere Buekers, Zelem-Halen (BE); Dirk Deroost, Baal-Tremelo (BE); Thomas E. McNeal, Hanceville, AL (US); Dirk Roosen, Tienen (BE); Els Timmermans, Wilsele Putkapel (BE); Filip Vandeputte, Linden (BE)

(73) Assignee: Tyco Electronics Raychem NV (BE)

( * ) Notice: Subject to any disclaimer, the term of this patent is extended or adjusted under 35 U.S.C. 154(b) by 389 days.

(21) Appl. No.: 11/215,583

(22) Filed: Aug. 30, 2005

(65) Prior Publication Data
US 2006/0037687 A1 Feb. 23, 2006

Related U.S. Application Data

(62) Division of application No. 10/204,721, filed as application No. PCT/GB01/01021 on Mar. 7, 2001, now Pat. No. 6,960,380.

(30) Foreign Application Priority Data

Mar. 7, 2000 (GB) .................. 0005309.0
Jun. 7, 2000 (GB) .................. 0013820.6

(51) Int. Cl.
*H01B 7/02* (2006.01)
(52) U.S. Cl. .................. 156/53; 156/289; 156/213; 156/187
(58) Field of Classification Search .................. 156/51, 156/53, 213, 187, 289; 428/40.1, 41.7, 41.8, 428/42.2; 277/312, 314, 315
See application file for complete search history.

(56) References Cited

U.S. PATENT DOCUMENTS 4,466,843 A * 8/1984 Shimirak .................. 156/48
4,472,222 A * 9/1984 Moisson et al. ............. 156/86
4,511,415 A 4/1985 Dienes .................. 156/48

(Continued)

FOREIGN PATENT DOCUMENTS

DE  3327821  4/1984

(Continued)

OTHER PUBLICATIONS

PCT Search Report for PCT/GB01/01021, date unknown.

(Continued)

*Primary Examiner*—Jeff H. Aftergut
*Assistant Examiner*—Daniel McNally
(74) *Attorney, Agent, or Firm*—Myers Bigel Sibley & Sajovec

(57) ABSTRACT

Methods for providing a cable closure enclosing a cable splice include wrapping a flexible wrap including a gel layer and a flexible support layer around the cable splice with the gel layer adjacent the cable splice. The gel layer may have an adhesion-reducing substance applied on at least part of a surface of the gel layer facing away from the flexible support layer and a removable cover layer may be applied to a surface of the gel layer facing away from the flexible support layer on which the adhesion-reducing substance is not applied. The wrap is gathered into overlapping wrinkles around at least one longitudinal end of the cable splice without applying heat, other external energy source or catalytic agent to allow the gel layer to seal the at least one longitudinal end of the cable splice.

9 Claims, 7 Drawing Sheets

U.S. PATENT DOCUMENTS

| | | | |
|---|---|---|---|
| 4,661,099 A | | 4/1987 | von Bittera et al. ......... 604/290 |
| 4,863,535 A | * | 9/1989 | More ........................... 156/49 |
| 4,962,286 A | * | 10/1990 | Jensen et al. ................. 174/92 |
| 5,162,142 A | * | 11/1992 | Ericson et al. ................. 428/77 |

FOREIGN PATENT DOCUMENTS

| | | | |
|---|---|---|---|
| EP | 0 246 855 | | 11/1987 |
| EP | 0 319 305 | | 6/1989 |
| GB | 1 223 303 | | 2/1971 |
| GB | 1223303 A | * | 2/1971 |
| GB | 2 129 230 | | 5/1984 |
| GB | 2 324 747 | | 11/1998 |
| WO | 89/09128 | | 10/1989 |
| WO | 91/03377 | | 3/1991 |
| WO | 92/11675 | | 7/1992 |
| WO | 92/21510 | | 12/1992 |
| WO | 97/05671 | | 2/1997 |
| WO | 97/09391 | | 3/1997 |
| WO | 97/16869 | | 5/1997 |

OTHER PUBLICATIONS

UK Search Report for GB 001382.6, date unknown.
UK Search Report for GB 0005309.0, date unknown.
Amendment to UK Search Report for GB 0005309.0, date unknown.
International Search Report for PCT/GB01/01021, date unknown.
International Preliminary Examination Report PCT/GB01/01021, date unknown.

* cited by examiner

METHODS FOR CABLE SEALING

RELATED APPLICATIONS

This application is a divisional application of U.S. application Ser. No. 10/204,721 filed on Aug. 22, 2002, now U.S. Pat. No. 6,960,380, which is a National Phase application of PCT/GB01/01021 filed on Mar. 7, 2001 and published in English, which claims priority from applications GB 0005309.0 filed on Mar. 7, 2000 and GB 0013820.6 filed on Jun. 7, 2000.

FIELD OF THE INVENTION

The present invention relates to a flexible wrap and to a method for enclosing a cable splice using such a wrap.

BACKGROUND OF THE INVENTION

Traditionally, cable splice closures would be heat-shrinkable, such that on applying heat, the closure would shrink and closely encapsulate the splice, providing a good seal. However, there is a growing demand for so-called cold applied closures, which can be applied without use of heat or other external energy source.

Several types of cold applied closures have been proposed. Some involve tape which can easily be wrapped around the cable splice. Many closures involve gel or gel-type materials because of their excellent sealing properties, especially when suitably enclosed and compressed against an object to which a seal is desired. Existing hard-shelled closures, disclosed in for example WO-A-9516500, are provided with chambers for containing the gel. Although such an arrangement provides an excellent seal, the predetermined size of a hard-shelled closure requires a range of closures to be provided in order to be able to accommodate cable splices of various shapes and dimensions.

SUMMARY OF THE INVENTION

The present invention seeks to avoid these and other problems of the Prior Art and to provide a sealing component and method which can be easily and economically applied, without specific structural adaptation, to provide a cable closure which is re-enterable and which fits a wide range of cable splice sizes and shapes.

These and other objects are achieved according to the present invention by a flexible wrap for enclosing a cable splice, which wrap in accordance with the present invention comprises a gel layer and a support layer, the gel layer being separate from or laminated to the support layer, wherein the wrap, when wrapped around a transition from a first elongate object of diameter 110 mm to a second elongate object of diameter 41 mm with the support layer outside (and preferably in direct contact with) the gel layer, is sufficiently flexible to be manually gathered into wrinkles around the second object with the gel sealing the closure thereto. The gel layer and the support layer may be wrapped separately around the transition between the first and second cables or other conduits to which a seal is desired, preferably with the gel layer and support layer in direct contact with each other, although other thin flexible layers might be interposed between them, for example as a vapour barrier. More preferably, the gel layer and support layer will be laminated together to provide a single sheet wrap.

In preferred wraps according to this invention, an adhesion-reducing substance is applied on at least part of the surface of the gel layer facing away from the support layer; or alternatively, a low-adhesion gel could be used. Such reduced gel adhesion facilitates installation of the wrap in use, as will be explained hereinafter, but wraps without reduced gel adhesion are not excluded. Another preferred form of flexible wrap according to the present invention may comprise a vapour barrier layer, which may be on the surface of the support layer facing away from, or on the surface of the support layer facing towards, the gel layer in use, or may be incorporated as an intermediate layer within the support layer, or may be provided separately from the support layer between it and the gel layer. The wrap may include both the adhesion-reducing substance and the vapour barrier layer.

The gel layer in the wraps according to this invention will be selected by known criteria to provide excellent sealing properties, while the support layer contains the gel and prevents it from being pressed out of the closure formed from the wrap in use. In addition, the support layer provides mechanical protection and improves the sealing properties of the wrap.

A flexible wrap including a gel layer according to the invention can be wrapped around a cable splice with the gel layer facing inwards allowing an easy transition from the larger splice diameter to the smaller cable diameter while advantageously providing an extremely long sealing length. The gel layer has the unique ability, not possessed by mastics and other known sealants, to maintain effective sealing when portions of the wrap projecting beyond the splice are gathered into wrinkles around (and preferably secured around) the cable(s) and/or the smaller end of the transition region. This provides both great versatility and ease of end sealing, enabling the mechanically simple wrap according to this invention to be used over a wide range of cable and splice shapes and sizes.

To facilitate the handling and installation of the wrap, the exposed surface of the normally tacky gel, with or without the aforementioned adhesion-reducing substance, may be wholly or partially covered by a removable cover layer, preferably constituted by so-called release paper. This cover layer shields the sticky surface of the gel layer and thus facilitates the handling of the wrap. On installation, the cover layer is removed and the stickiness of the gel layer is utilized to apply the wrap and keep it in place.

The inventors have found that it may in some cases be undesirably (although not necessarily unacceptably) difficult to adjust the position of the wrap once the gel layer sticks to the cable splice. For this reason, it is preferable that at least part of the gel layer on the flexible wrap of the present invention is provided with the aforementioned adhesion-reducing substance, for example a powder. This adhesion-reducing substance, which might be said to constitute a second, non-removable cover layer, reduces the tack sufficiently for convenient adjustment of the wrap position when laid over the cable splice. In a preferred embodiment the adhesion-reducing substance comprises talc powder. Alternatively, wraps having a gel layer at least part of which has low or substantially zero tack could be used, possibly without any cover layer and/or possibly without any adhesion-reducing substance, and with or without the vapour barrier layer.

Preferably, the wrap comprises a middle section provided with the adhesion-reducing substance and two adjoining outer sections not provided with said substance. Prior to the application of the wrap, the middle section is uncovered by removal of a middle portion of the cover layer (if present), while the outer sections preferably each remain protected by outer portions of the removable cover layer. Although a single piece of cover material could be used to cover both the outer sections and the middle section of the gel layer, or three pieces of cover material could be used respectively to cover the middle section and the outer sections, it may be preferable for individual pieces of cover material to cover only the outer sections, leaving the middle section covered only by the adhesion-reducing substance.

Preferably, the support layer comprises a substantially continuous, substantially non-elastomeric sheet of material having suitable flexibility and thickness (readily determined by trial and error or by methods hereinafter described) for the present wrapping purposes. Such a layer can be selected to provide good mechanical strength as well as good bonding with the gel layer. Polyethylene, especially linear low density polyethylene, with or without known adhesion-promoting surface treatments or coatings, is one example of a preferred material for the support layer.

A vapour barrier layer is not essential, but may be provided on the support layer as aforesaid, preferably on the surface the facing away from the gel layer. Such a vapour barrier layer prevents moisture vapour transmission through the wrap. Advantageously, the vapour barrier layer comprises aluminum, for example aluminum foil. The aluminum layer provides an excellent moisture vapour barrier, which may be especially desirable in applications where the splice enclosure is not completely filled with sealant and/or other materials.

Advantageously, a protective layer is provided on the side of the wrap facing away from the gel layer. Such a protective layer is preferably selected to provide enhanced tear and puncture resistance. Examples of suitable materials are PET (polyethylene terephthalate) or LDPE (low-density polyethylene).

A closure according to the present invention comprises a flexible wrap as discussed above. In addition, such a closure may comprise other components such as flexible tape for applying pressure on the gel in the wrap.

The present invention further provides a method of providing a cable closure enclosing a cable splice, which method comprises the steps of applying on the cable splice a flexible wrap comprising a gel layer and a support layer, preferably a wrap as defined above; adjusting the position of the flexible wrap as desired so that it extends beyond the splice over adjacent cable or transition regions of smaller diameter than the splice; wrapping the flexible wrap around the cable splice; and gathering the wrap into wrinkles and securing it around the said cable or transition regions. Preferably, the method includes the step of winding tape around the wrap so as to cover the cable closure. Winding the tape around the wrap exerts pressure on the gel layer, thus enhancing its sealing action. This tape preferably is an elastic plastic or rubber tape, the elasticity of which ensures that the gel layer of the wrap is kept under compression after installation, for example in case of ambient temperature cycling which may vary between minus 30 and plus 60 degrees Celsius. In addition, a rubber tape tends to improve the puncture resistance of the resulting splice closure.

Prior to applying the flexible wrap, the cable splice (filled or non-filled) is preferably provided with a (plastics) liner or additional tape to form a solid surface.

In addition to its use in directly wrapped "dry" splice closures, the wrap of the present invention is particularly suitable for filled splices incorporating liquid encapsulant, preferably a curable liquid encapsulant of known kind, for example a two-part epoxy encapsulant system. In this case, the flexible wrap may be initially wrapped around the cable splice in such a manner that an envelope having an upwardly facing opening is formed, the liquid encapsulant is poured into the opening, and the opening is subsequently folded closed and secured to retain the liquid encapsulant before and during solidification. Another possibility is to pre-form a filled splice by known methods and protect it by applying the wrap according to the present invention over the pre-formed filled splice.

BRIEF DESCRIPTION OF THE DRAWINGS

The invention will further be explained with reference to exemplary embodiments illustrated in the accompanying drawings in which.

DETAILED DESCRIPTION OF THE ILLUSTRATED EMBODIMENTS

Figure 1:
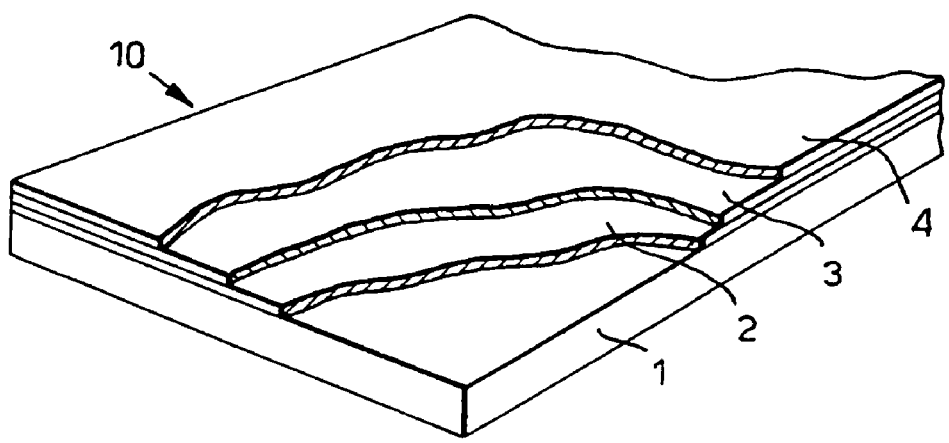
FIG. 1 schematically shows, in a partially exposed view, flexible wrap of the present invention.

The flexible wrap 10 schematically shown in FIG. 1 comprises, in this particular embodiment, four layers:

a gel layer 1;

a support layer 2;

an optional vapour barrier layer 3; and an optional protective layer 4.

The gel layer 1 may consist of thermoplastic gel known per se. The support layer 2, which in this preferred embodiment is constituted by low density polyethylene, provides mechanical stability to the gel. The vapour barrier layer 3 is in this embodiment is a moisture vapour transmission barrier constituted by a layer of aluminum foil. The polyethylene support layer 2 ensures good bonding respectively of the aluminum and the gel, even when the wrap 10 is folded.

The protective layer 4, which in this embodiment is constituted by a layer of PE (polyethylene) or PET (polyethylene terephthalate) applied on the other side of the aluminum foil, protects the aluminum and helps to resist puncturing and tearing, as well as chemical resistance to the environment. It will be understood that the vapour barrier layer 3 and/or the protective layer 4 may be omitted, depending on the actual materials used and the end use conditions to be experienced by the wrap. Likewise, the thickness of the wrap, which largely corresponds to the thickness of the gel layer 1, will depend on the intended use of the wrap. Although a total wrap thickness of about 1 to 1.5 mm is preferred, wraps having a much greater or somewhat smaller thickness can be envisaged.

Figure 2:
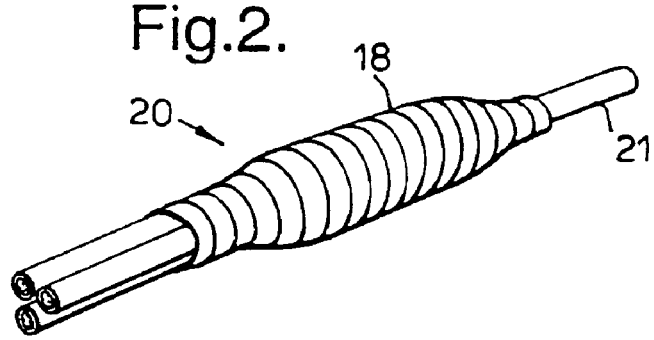
FIG. 2 shows, in perspective, a filled and wrapped cable splice.

The cable splice 20 shown in FIG. 2 is wrapped in a retaining tape 18 which retains any filling material. The retaining tape 18 applied on the filling material provides a solid surface on which a flexible wrap according to the invention can be applied, as will be explained with reference to FIG. 4.

Figure 3:
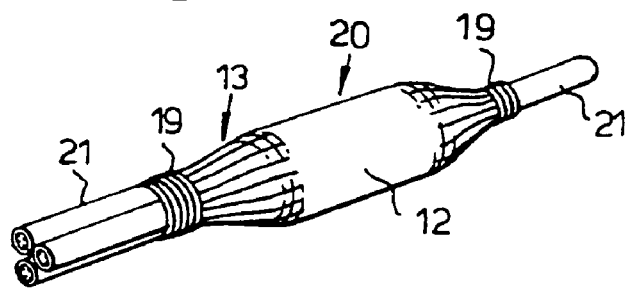
FIG. 3 shows, in perspective, a cable splice provided with a plastic liner.

A solid or leveled surface may also be obtained by applying a liner 12, as shown in FIG. 3, wherein the liner 12 is made of plastic and has flexible fingers 13 extending in the direction of the cables 21. Tape 19 is wound around the cables 21 at the ends of the flexible fingers 13 to retain them. In this way, a smooth and solid transition from the splice diameter to the cable diameter is obtained.

Figure 4:
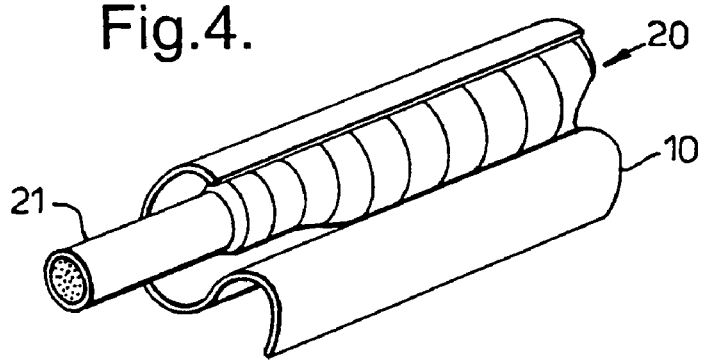
FIG. 4 shows, in perspective, how the wrap of the present invention is wrapped around the cable splice of FIG. 2.
Figure 5:
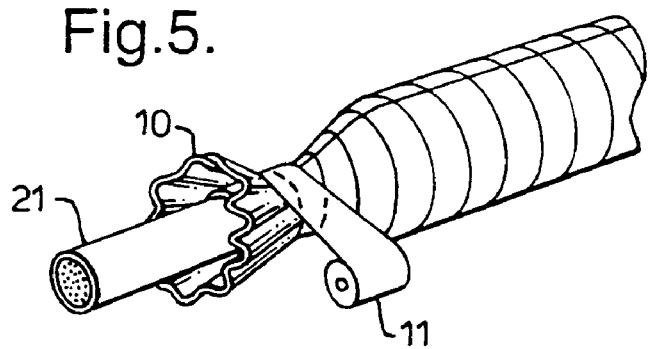
FIG. 5 shows, in perspective, how (transparent) tape is applied over the wrapped cable splice of FIG. 4.

As shown in FIG. 4 the leveled or solidified splice 20 of FIG. 2 (or of FIG. 3) can be wrapped in a flexible wrap 10 of the present invention with the gel layer 1 (FIG. 1) facing the splice. Subsequently an elastic tape 11 is tightly wound around the wrap 1, as shown in FIG. 5. Preferably the tape is a plastic or rubber tape. The tape can be self-adhesive.

Figure 6:
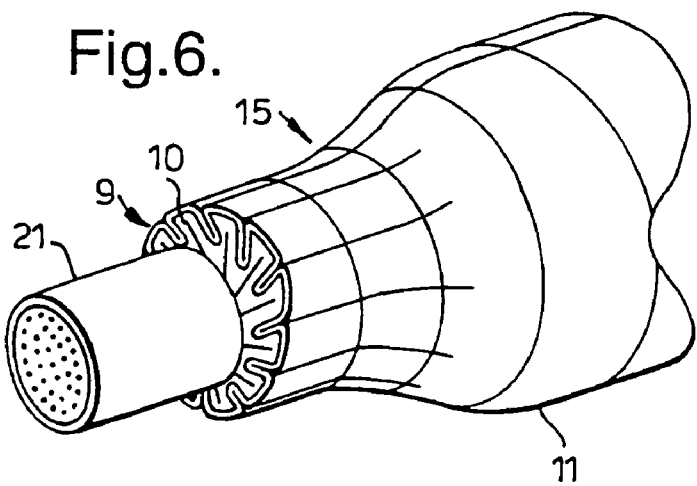
FIG. 6 shows, in perspective, part of the completed closure of FIG. 5 in more detail.

Part of the resulting closure 15 is shown in more detail in FIG. 6. The tight wrapping of the tape 11 has resulted in compression of the gel layer of the wrap 10 over the entire length of the closure, resulting in an exceptional sealing length. This compression is particularly advantageous near the ends of the closure, as the gel layer provides a good seal against the cable 21. Also, the tape 11 has gathered the flexible wrap 10 into wrinkles, creating gel-to-gel contact in successive wrinkles 9. It can thus be seen that the wrap of the invention provides a closure having excellent sealing properties while being easy to install on a wide range of splice and cable shapes and sizes. It is noted that no tools or applied heat are required to apply the closure. Also, the closure is re-enterable in that the tape 11 can be removed, after which the wrap 10 is openable and reusable, due to the cohesive strength and resulting clean separation of the gel from surface contact with itself or other bodies. The closure provided by the invention can therefore be used as both a temporary and a permanent closure.

Figure 7:
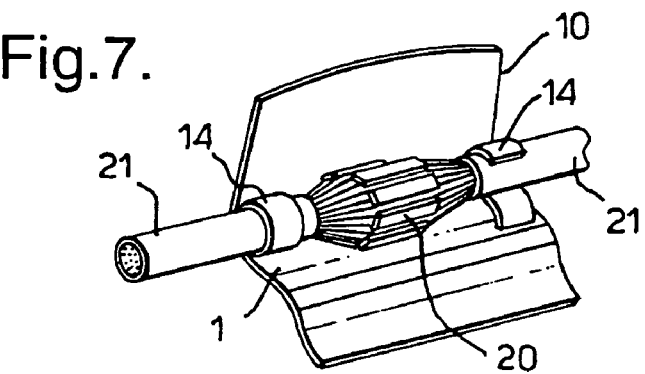
FIGS. 7 to 10 show, in perspective, how an encapsulated filled cable splice is applied using the wrap of the present invention.

It is shown in FIGS. 7-10 how the flexible wrap of the present invention can be used to make an encapsulant-filled cable closure. As shown in FIG. 7, in a first step, the wrap 10 is applied directly on the cable splice 20 without prior filling of the splice as in FIGS. 2 and 3. To enhance the sealing at the ends of the closure, gel tapes 14 are wound around the cables 21 prior to applying the flexible wrap 10. However, these gel tapes 14 are not essential and may be omitted in various applications.

Figure 8:
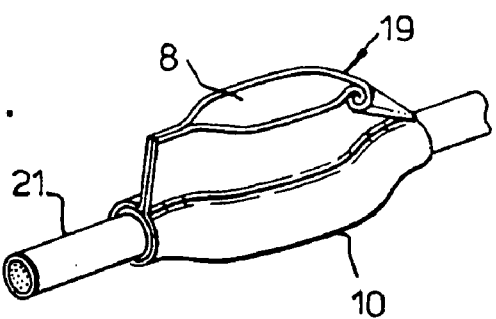

In the second step, shown in FIG. 8, the wrap 10 is folded so as to form a pouch 19 having an upward facing opening 8. On both sides of the opening 8 the edges of the wrap 10 are curled together to close off the sides of the pouch. Also, sealing tape 17 is wound around the wrap at the ends of the closure. The gel layer of the wrap 10 will in both instances provide proper sealing, preferably enhanced by the action of the gel tapes 14 (FIG. 7).

Figure 9:
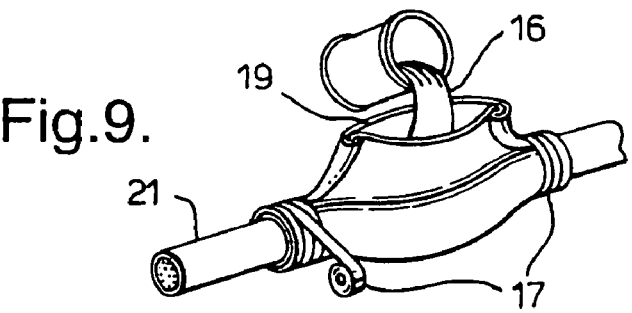

In the third step, as shown in FIG. 9, liquid encapsulant 16 is poured into the pouch 19 through the opening 8 and is allowed to fill the pouch.

Figure 10:
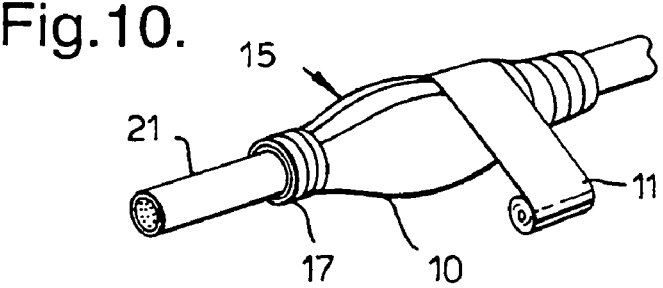

In the fourth step, shown in FIG. 10, the pouch is closed by folding it over and tape 11 is firmly wound around the wrap 10, putting the gel layer of the wrap under compression. This completes the cable closure 15.

When the flexible wrap 10 is applied on a cable splice, the adhesive nature of the gel layer 1 (FIG. 1) will make the wrap stick to the cable splice. Although this "stickiness" helps to keep the wrap in place, it may make it less-than-ideally convenient to adjust the position of the wrap. According to a further aspect of the present invention, therefore, part of the gel layer 1 is provided with an adhesion-reducing substance 6 to facilitate the application of the wrap on the cable splice and to allow any adjustment (e.g. moving the wrap along the length of the cable splice). The adhesion-reducing substance 6 advantageously is a powder, such as talc powder.

Figure 11:
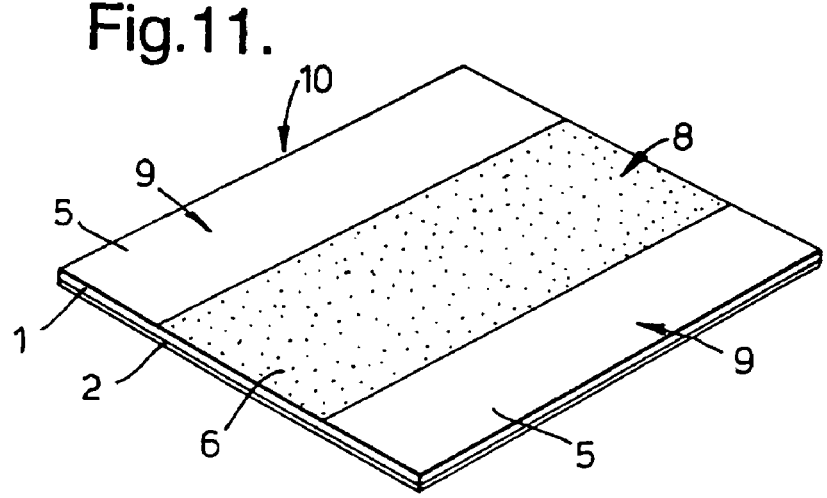
FIG. 11 schematically shows, in perspective, a preferred embodiment of the flexible wrap of the present invention.

As shown in FIG. 11, the part of the gel layer on which the adhesion-reducing substance 6 is applied is a middle section 8 of the side of the gel layer 1 facing away from the support layer 2 (that is, facing up in FIG. 11). On both sides of the middle section 8 there are outer or side sections 9 on which the substance 6 is not applied. To facilitate the handling of the wrap 10 before it is applied, a removable cover layer 5 is applied on each of the outer sections 9. In the preferred embodiment the cover layer 5 is constituted by wraps of special paper, so-called release paper. Instead of two separate wraps of release paper for each of the outer sections 9, a single wrap of paper covering the entire flexible wrap 10 could be used.

Figure 12:
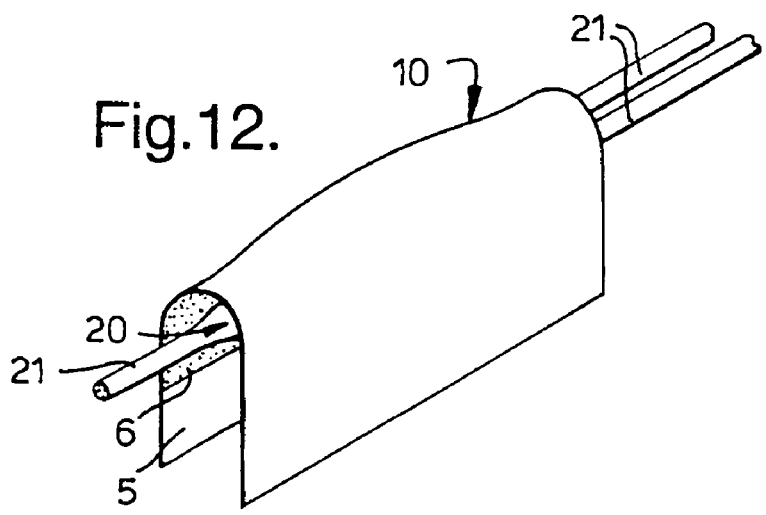
FIGS. 12 and 13 schematically show, in perspective, how the flexible wrap of FIG. 11 is applied.
Figure 13:
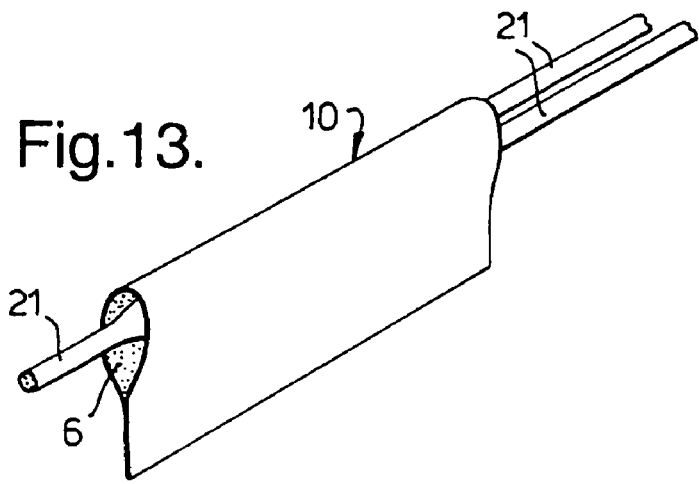

As shown in FIG. 12, the wrap 10 of FIG. 11 is preferably applied with the cover layer 5 still in place. The middle section 8 with the adhesion-reducing substance is advantageously large enough to cover all of the cable splice. After adjusting the wrap 10, which adjusting may include aligning the rims of the wrap 10, the cover layer 5 (paper wraps) is removed and the two sticky outer sections are pressed together. As these outer sections are sticky, they will stay together. Subsequently further steps may be carried out as shown in, for example, FIG. 5 or FIG. 8.

It is noted that the invention can accommodate closures of almost any size. The only tool which may be required is a pair of scissors or a knife to cut the wrap 10 to size and/or to cut off any tape that may be required. Mechanical forces, such as axial pulling forces, do not affect the sealing of the closure. Due to the gel layer the wrap of the present invention provides closures having a self healing effect: the pressurized gel is able to seal off small punctures caused by sharp objects. In addition, the gel layer automatically provides a spacing between any connectors contained in the splice and the outer layers of the closure, thus preventing punctures from within.

Closures comprising a wrap according to the present invention can be used for both telecommunications cables and power cables.

In addition to the advantages of easier positioning during installation provided by the adhesion-reducing material on the gel, further advantages have been demonstrated in terms of re-enterability of the closure after installation. Gel with talc adhesion-reducing material on its surface can be separated cleanly, substantially without damage to the gel, from a surface (of the gel itself or of another object) with which it has been pressed into contact. Such clean separation is attainable over a much wider range of separation temperatures, for example from minus 45 to plus 80 or 90 degrees Celsius, than can be achieved with a corresponding un-talced gel or with a mastic sealant. The un-talced gel tends to be undesirably difficult to separate at separation temperatures of −15 degrees Celsius and below, while the mastics tend to undergo cohesive failure at all separation temperatures.

The unique ability of the gel to maintain sealing in the gathered wrinkles of the wrap according to the invention is demonstrated as follows. A suitably flexible support of less than 0.1 mm thickness comprising alternating layers of aluminum foil and low density polyethylene film is coated with gel to a total wrap thickness of about 1.5 mm. This wrap is wrapped around a transition between two hollow conduits respectively of diameter 110 mm and 41 mm. The applied wrap is sealed around the conduits by pulling cable ties around it at various tensions, measured by spring balance or more preferably applied by static weights attached to the cable ties, to produce a closure according to the invention with the wrap ends gathered around the respective conduits. Internal gas pressure of 5 kPa is applied while the closure is immersed in a water bath at various temperatures. The emergence of bubbles at the gathered ends of the wrap indicates when the applied cable tie tension is insufficient to enable the gel seal to resist the internal gas pressure. It has been found for the above specified wrap that a tie tension of only 69 to 98 Newtons (7 to 10 kg force) is sufficient to retain the gas when tested at 22 degrees Celsius, rising to about 98 to 196 Newtons (10 to 20 kg force) at 45 degrees, and rising to about 127 to 235 Newtons (13 to 24 kg force) at minus 10 degrees. By way of comparison, thicker, less flexible gel-coated wraps require tie tensions of about 147 to greater than 265 Newtons (15 to greater than 27 kg force) to retain the gas even at 22 degrees Celsius, while mastic-coated wraps tend to fail at all temperatures, even when the ties are tensioned to more than 265 Newtons (27 kg force).

The procedure for this Pressure Retention Test is as follows, with reference to the illustrative FIGS. 14 to 19.

1. Scope

This method covers the determination of the Force (N) needed to gather into wrinkles and seal off an oversized gel wrap around a small cable diameter.

2. Samples and Equipment
    a) Gel wrap: As selected for test. (Pref. width 450 mm, length 550 mm)
    b) HDPE tube: Outer diameter 110 mm, length 400 mm.
    c) HDPE tube: Outer diameter 41 mm, length 700 mm.
    d) Cable Tie: commercially available self-locking UV stabilized Nylon 66 of appropriate length having head width 14.2 mm and head thickness 8.8 mm; and having tail width 8.9 mm and tail thickness 2 mm, with teeth formed on the tail which engage the head to self-lock the tie as the tail is drawn through the head.
    e) Water bath at 22° C. and 45° C.
    f) Water bath with ice water (0° C.).
    g) Weights of 27 kg, 24 kg, 20 kg, 15 kg, 10 kg and means for attaching them to the tail of the cable ties.
    h) Hose clamp.
    i) Pressure delivery device to create an internal pressure of 5 kPa.
    j) Temperature chamber at −10° C. and +45° C.

4. Procedure
    a. Test at Room Temperature (22° C.)

Seal off the ends of the small tube by existing methods (for example heat shrinkable end caps) and provide at one end pressure access. Drill some holes in the smaller tube at 350 mm from the end of the tube. (See FIG. 14)

Centre the smaller tube inside the bigger tube and seal the gap between the tubes by existing methods (for example inflatable bags). Fix the smaller tube in the wider tube so that minimum 350 mm of the smaller tube including the drilled holes sticks out of the bigger tube. (See FIG. 14)

[It is to be noted that this assembly of two tubes may be replaced by a one-piece closed hollow mandrel shaped to provide a corresponding large-to-small transition with suitable pressure inlet means and corresponding pressure outlet holes.]

Figure 14:
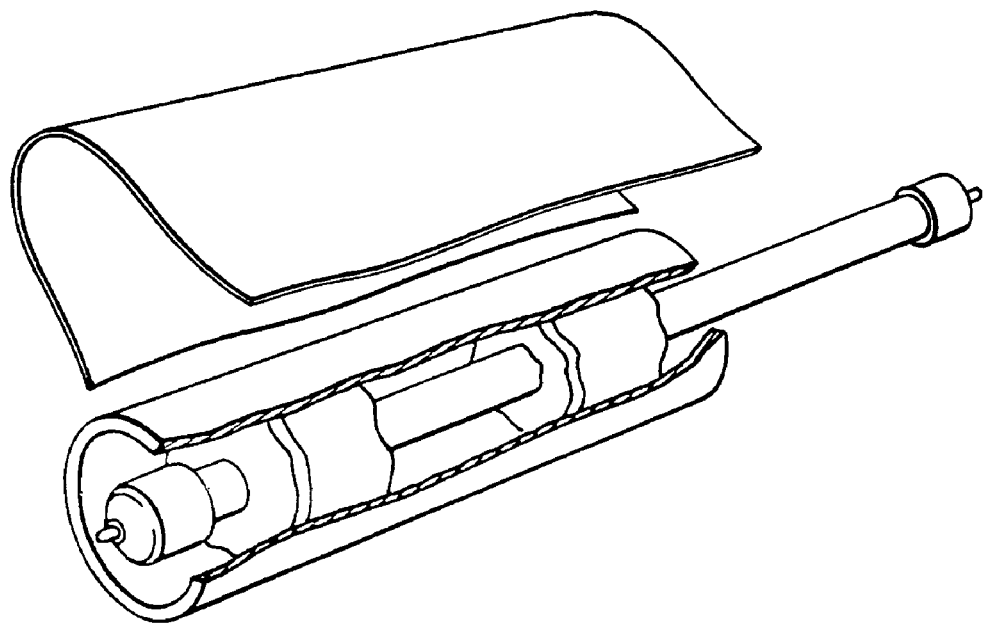
FIGS. 14 to 19 illustrate a test method, described hereinafter, for selecting the wraps.
Figure 15:
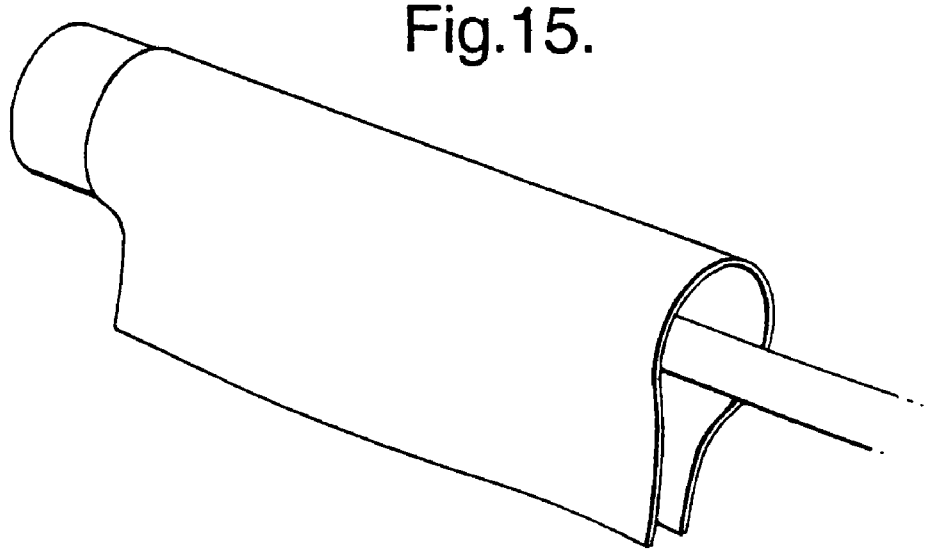
Figure 16:
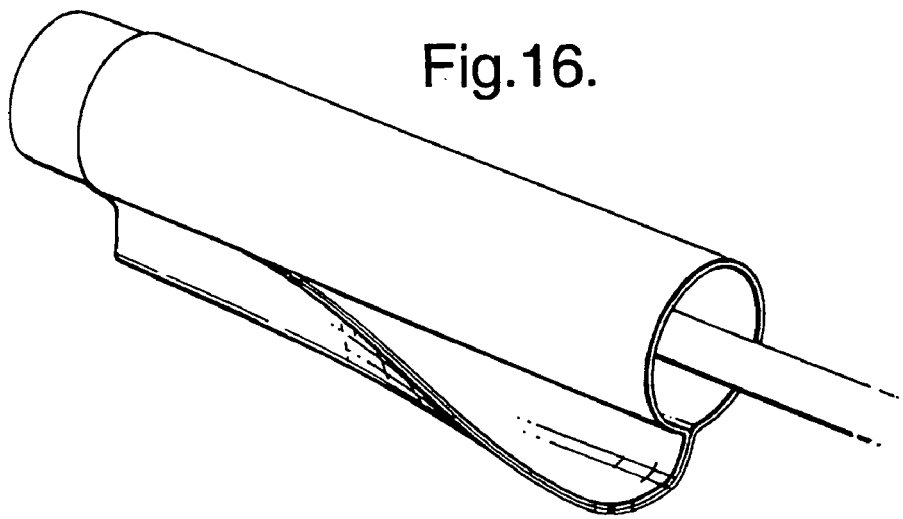
Figure 17:
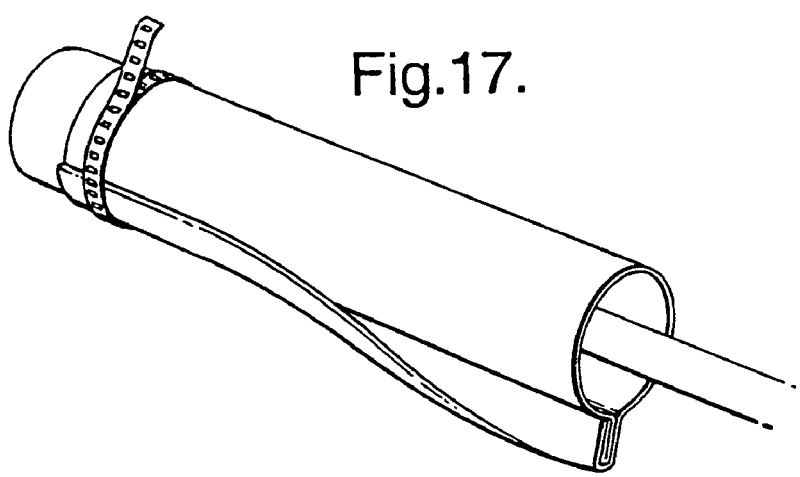

Put the gel wrap over the transition area between the two tubes (See FIG. 14). Form a flap of 100 mm by sticking the wrapped edges of the gel wrap together (See FIG. 15). Fold this flap in two and fix it to the bigger tube with some vinyl tape (See FIG. 16). Place a big hose clamp around the gel wrap on the bigger tube to tighten this end of the gel wrap (See FIG. 17). If necessary an extra amount of gel can be put under the gel wrap and the hose clamp to be sure there won't be any leaks at this end during testing.

Figure 18:
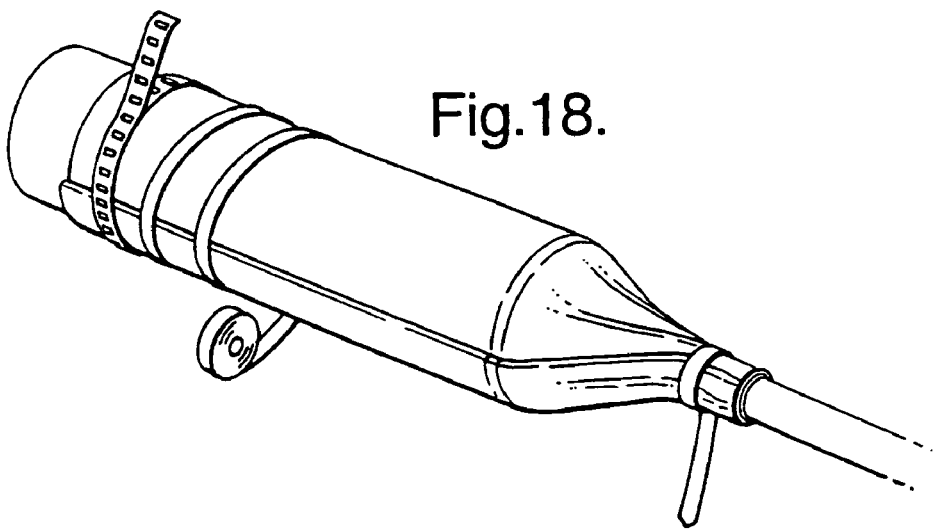
Figure 19:
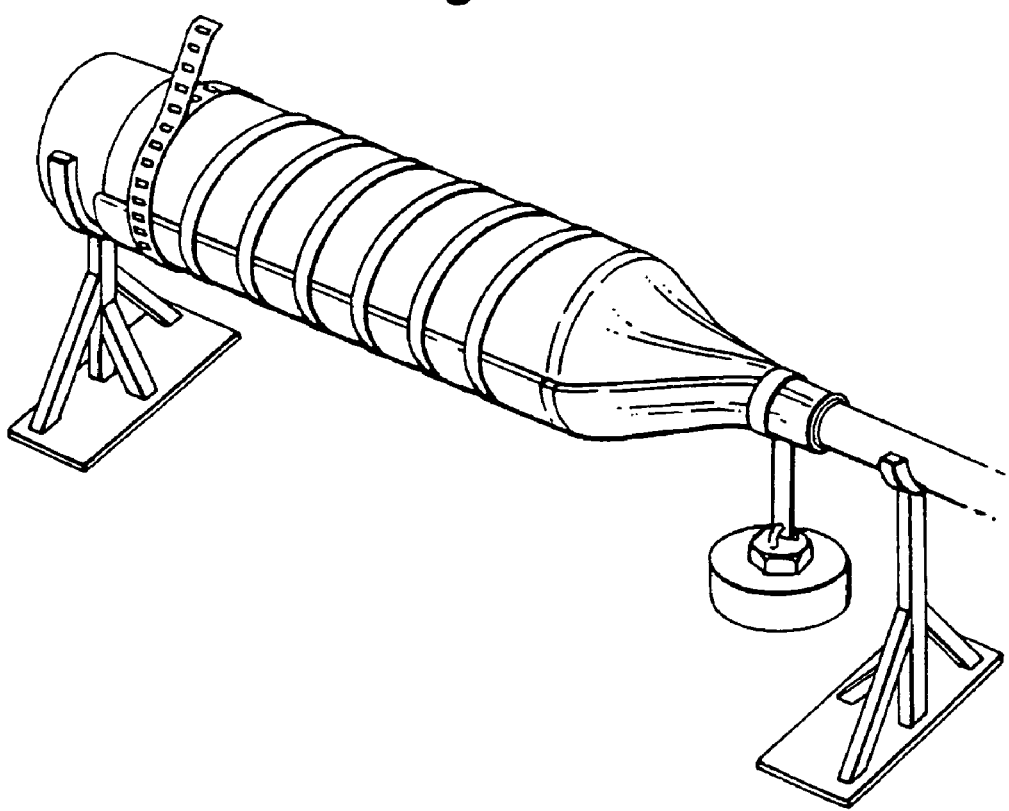

Take the cable tie and install it loosely to gather the applied wrap around the smaller tube at a distance of 150 mm from the bigger tube so as to enclose the part of the smaller tube having the drilled holes (See FIG. 18). To avoid any pressure leaks in the longitudinal seal along the wrap between the hose clamp and the cable tie, some vinyl tape is wrapped around the gel wrap in this area to prevent unrolling of the aforementioned flap (See FIG. 19).

Support the ends of the whole assembly in a way that the friction is minimised (for example on rollers) and attach smoothly the selected weight to the tail of the cable tie, taking care to align the applied weight fully on the cable tie. Let the weight hang for 1 minute to tighten the tie (See FIG. 19), then remove the weight leaving the tie self-locked around the gathered portion of the wrap.

Put the assembly in the water bath, connect a pressure tube from the pressure delivery device to the pressure access of the small tube, and apply internal air pressure of 5 kPa. If there are no air bubbles escaping from the end of the enclosure where the wrap is gathered and tied around the small tube during an immersion time of 1 minute at the internal air pressure of 5 kPa, the wrap passes the test.

b. Test at +45° C.

Same procedure as above, except: Condition the gel sheet for 4 hours at 45° C. before testing. Carry out the test in a temperature chamber at 45° C. in which the sample is immersed in a water bath at 45° C.

c. Test at −10° C.

Same procedure as above, except: Condition the gel sheet for 4 hours at −10° C. before testing. Carry out the test in a temperature chamber at −10° C. in which the sample is immersed in an ice water bath at 0° C.

5. Reporting

Record the applied tension (N) on the cable tie necessary to seal off the assembly at the internal pressure of 5 kPa. For preferred gel wraps, this tension will be less than or equal to 265 Newtons (27 kg force) at the three different test temperatures.

The above Pressure Retention Test thus serves as a method of selecting preferred wraps having sufficient flexibility for convenient installation according to the present invention. Preferably, wraps will be selected which are capable of preventing bubbles from escaping at all test temperatures from minus 10 to plus 45 degrees Celsius when the specified cable tie is tightened to a tension of not more than 265 Newtons (27 kg force), preferably not more than 235 Newtons (24 kg force), more preferably not more than 196 Newtons (20 kg force), and especially not more than 147 Newtons (15 kg force). Especially preferred are wraps which prevent bubbles at 22 degrees Celsius with a cable tie tension of less than 98 Newtons (10 kg force).

Preferred support layers for use in the wraps of the present invention have a laminate structure of total thickness about 81 micrometers comprising successive layers of about:

30 micrometers thickness low density polyethylene,
12 micrometers thickness polyethylene terephthalate,
9 micrometers thickness aluminum foil,
30 micrometers thickness low density polyethylene.

The gel is melt coated onto this laminate in known manner, preferably to a total wrap thickness of about 1.5 mm plus or minus 0.5 mm.

The gels for use in accordance with the present invention may be any of the curable or thermoplastic oleophilic polymer gels described in numerous patents, notably by Raychem companies. Preferred gels are known thermoplastic triblock copolymer gels, examples including those described in Raychem Patents U.S. Pat. No. 5,541,250 (RK451) and U.S. Pat. No. 5,618,882 (RK469), the disclosures of which are incorporated herein by reference.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

The invention claimed is:

1. A method for providing a cable closure enclosing a cable splice, comprising:
    wrapping a flexible wrap including a gel layer and a flexible support layer around the cable splice with the gel layer adjacent the cable splice, wherein the gel layer has an adhesion-reducing substance applied on at least part of a surface of the gel layer facing away from the flexible support layer and wherein a removable cover layer is applied to a surface of the gel layer facing away from the flexible support layer on which the adhesion-reducing substance is not applied; and
    gathering the wrap into overlapping wrinkles around at least one longitudinal end of the cable splice without applying heat, other external energy source or catalytic agent to allow the gel layer to seal the at least one longitudinal end of the cable splice.

2. The method of claim 1 wherein wrapping the flexible wrap is preceded by leveling an external surface of the cable splice.

3. The method of claim 2 wherein leveling an external surface of the cable splice comprises at least one of wrapping tape around the cable splice or applying a liner to the cable splice.

4. The method of claim 2 wherein leveling an external surface of the cable splice comprises applying a liner having longitudinally extending flexible fingers to the cable splice, the fingers extending over at least a portion of the at least one longitudinal end of the cable splice.

5. The method of claim 1 wherein wrapping the flexible wrap comprises:
    forming an envelope with an upwardly facing opening around the cable splice with the wrap;
    pouring a liquid encapsulant into the opening of the envelope; and
    closing the opening of the envelope.

6. The method of claim 5 wherein pouring a liquid is preceded by wrapping a sealing tape around longitudinally displaced ends of the wrap to retain the liquid encapsulant in the envelope.

7. The method of claim 5 wherein closing the opening of the envelope comprises:
    folding the wrap over the opening; and
    winding a tape around the wrap to place the gel layer under compression.

8. The method of claim 1 wherein gathering the wrap includes winding tape around the gathered wrap to secure the wrap in a gathered position at the at least one longitudinal end of the cable splice.

9. The method of claim 1 wherein gathering the wrap is preceded by winding a gel tape around a portion of the at least one longitudinal end of the cable splice and wherein the wrap is gathered around the gel tape.

* * * * *